Feb. 13, 1945. H. V. SHEBAT 2,369,258
AIRCRAFT
Filed April 3, 1941 2 Sheets-Sheet 1
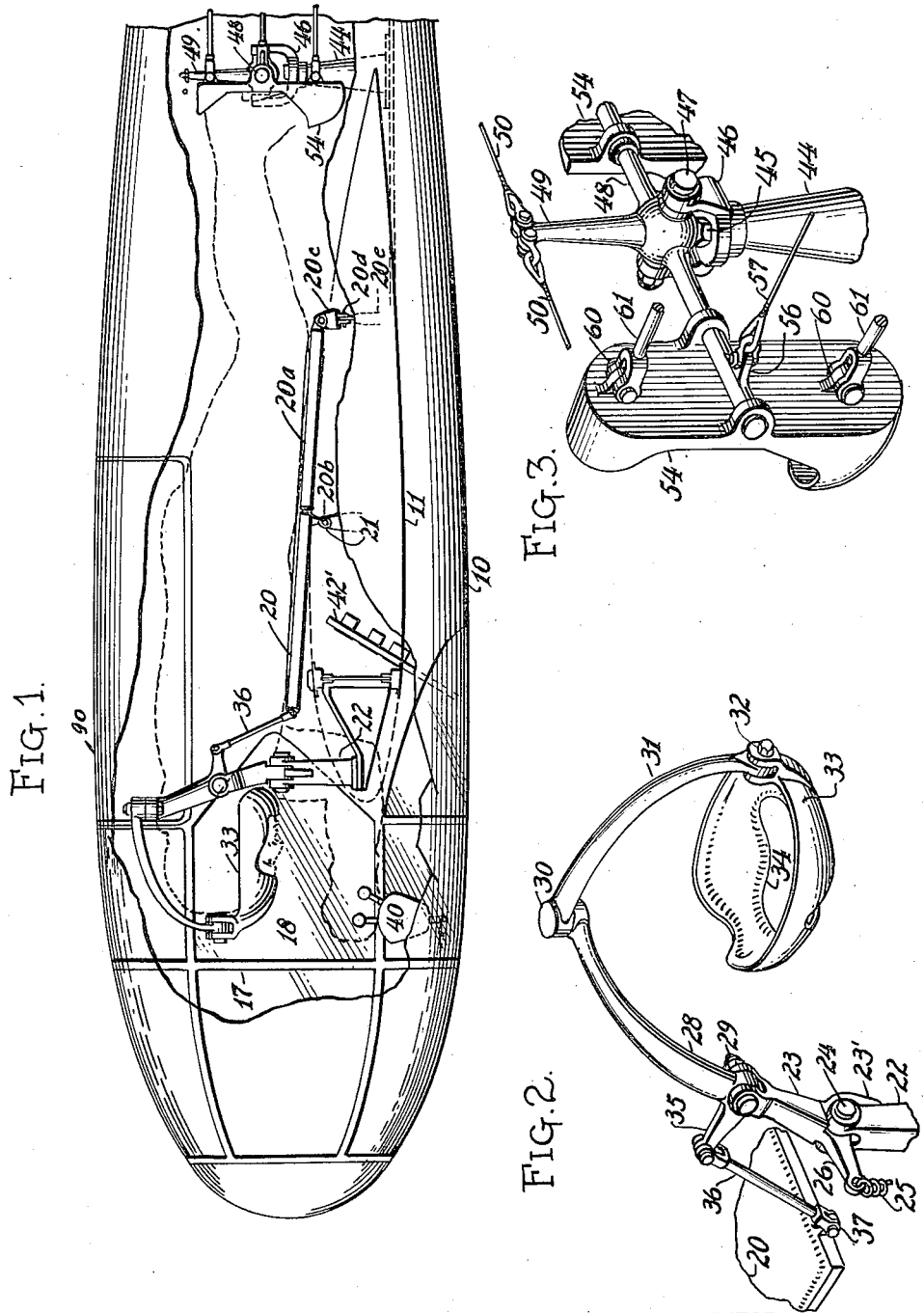
INVENTOR
*Herbert V. Shebat*
BY
ATTORNEY

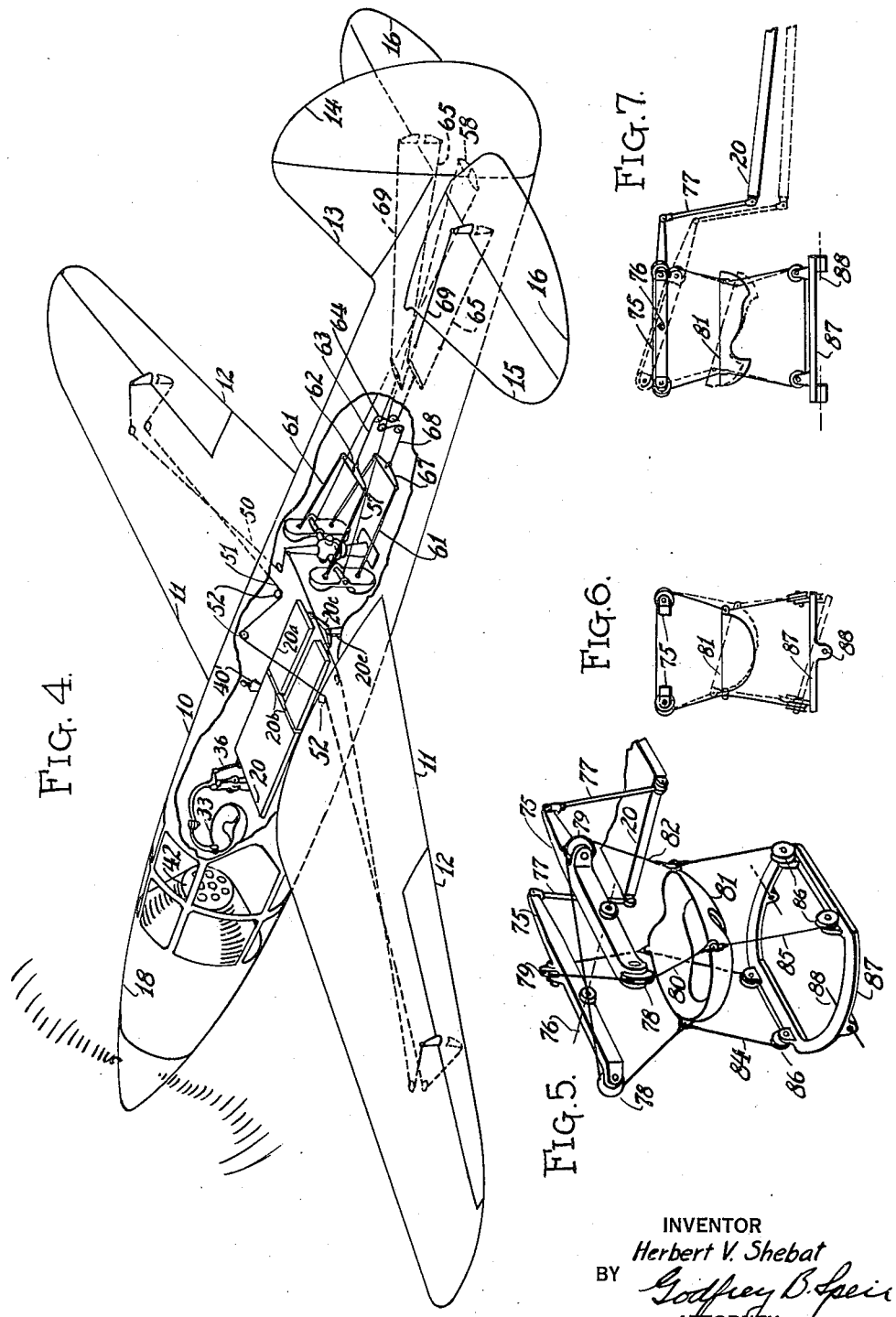

Patented Feb. 13, 1945

2,369,258

UNITED STATES PATENT OFFICE 2,369,258

AIRCRAFT

Herbert V. Shebat, Pompton Lakes, N. J.

Application April 3, 1941, Serial No. 386,571

5 Claims. (Cl. 244—122)

This invention relates to aircraft and is concerned with improvements in the accommodations for an aviator and also in the control mechanism of the aircraft.

A particular object of the invention is to provide accommodations and controls for the aviator so organized that the aviator may lie prone in the aircraft so as to be wholly supported against the effect of gravity and the effect of downwardly acting force resulting from such maneuvers of the aircraft as pullouts from dives.

With modern high speed aircraft and tactical maneuvers, the aircraft and its occupants are at times subjected to forces amounting to many times the force of gravity. Such high forces are normally evolved when the aircraft is quickly pulled out of a dive. The human system, when a person is in a seated position, can only stand about 5 to 7 g. (gravity) before the senses are subject to "blackout" which is believed to be a form of bodily, nervous, and mental defect of temporary character caused by drainage of blood from the head and upper part of the body. An aircraft structure can stand acceleration forces in excess of those which the human system is capable of withstanding, so the present limit on dive pullouts is determined by the limitations of the aircraft crew rather than by any limitations in the aircraft itself. This invention contemplates a prone position for an aviator (either pilot, passenger or crew member) with full support for his body and head against displacement due to high forces of acceleration acting in a downward direction with respect to the airplane, and it is believed that a prone aviator can withstand those acceleration forces which are now used in pullouts with much greater comfort than he could withstand when in a seated position. Carrying this philosophy still farther, a prone aviator could withstand higher acceleration forces before reaching the threshold of blackout than would be possible if he were seated in the conventional manner.

A further object of the invention is to provide accommodations for an aviator in an aircraft by which the more massive portions of this body will be wholly supported against downward forces without subjecting some portions of the body to the compression caused by other portions of the body which may be located at a higher level.

A further object of the invention is to provide an aircraft control system adapted to a prone position for the aviator whereby he may still control the aircraft with perfect freedom and by the more or less automatic muscular reactions which are considered to be present in the conventional stick and rudder control system.

A further object of the invention is to provide prone aviator accommodations whereby the cross-sectional area of the aircraft may be materially reduced, thus permitting of high fineness ratio in a fuselage or nacelle in which the aviator is located for the attainment of higher speeds than are now feasible.

Still another object is to provide a prone aviator accommodation which will allow of the construction of a high powered small aircraft of high speed wherein the cross-sectional area of the fuselage is small.

A further object is to provide means for improving vision from the aircraft.

Still another object is to provide head supporting means in a prone aviator accommodation which will permit of free articulation of the aviator's head while supporting same against displacement due to downward forces.

The specific provisions of the invention may be better understood by referring to the detailed description below in connection with the drawings, in which:

Fig. 1 is a side elevation of an aircraft body, partly broken away to show the aviator accommodation and a portion of the control system;

Fig. 2 is a perspective view of one form of head support;

Fig. 3 is a perspective view of the control pedestal for the air controls of an aircraft;

Fig. 4 is a perspective view of an aircraft, partly broken away to show the pilot accommodation and control system;

Fig. 5 is a perspective view of an alternative arrangement for a head support;

Fig. 6 is a front elevation of the alternative head support, and

Fig. 7 is a side elevation of the alternative head support.

Referring first to Figs. 1 to 4, 10 indicates a slender aircraft body from which wings 11 extend laterally, the wings being equipped with the usual ailerons 12. At the rear of the body 10 are disposed the usual fin 13, rudder 14, horizontal stabilizer 15, and elevator 16. The front of the body, forward of the wings 11, is skeletonized as to structure as at 17 and is covered by a transparent medium 18 throughout its circumference to allow of full vision in nearly all directions. Ahead of the skeletonized structure 17 a power plant 18 may be mounted as in Fig. 4 or alternately, the nose of the fuselage may be transparent as in Fig. 1, and power plants may be disposed in the wings.

Within the body 10 is a platform or cradle 20 pivoted on a transverse axis at its rearward end to fittings 21 rigid with the body structure. The cradle 20 is of such form and size as to reach from the hips to the chest of the average person, the width being adequate to support the body. Thigh rests 20a are hinged at 20b to the rear edge of the cradle, the thigh rests being supported at their rear ends by a rocker arm 20c pivoted at 20d to a pedestal 20e, whereby the rests move up and down oppositely as the aviator moves his legs for aircraft control while at all times supporting the thighs against downwardly acting forces.

Forward of the cradle 20 and to one side thereof is a rigid pedestal 22 carrying an arm 23 pivoted to the pedestal 22 on a fore-and-aft fulcrum 24, said arm 23 being moved to one side by means of a spring 25 anchored to an extension 26 on the arm and to the fuselage structure. A stop 23' limits the inward movement of the arm 23. To the top of the arm 23, a second arm 28 is pivoted on a transverse pivot 29, said arm 28 extending upwardly and substantially to the plane of symmetry of the fuselage, whereat a vertical pivot 30 supports a third arm 31 which extends forwardly and downwardly to a point which lies substantially on the axis of the neck of a person lying prone on the cradle 20. The front end of the arm 31 is provided with a longitudinal pivot 32 to which a face mask 33 is articulated, said mask being conformed to the head of the average individual and having a central aperture 34 through which the features of the aviator may protrude. Preferably, the mask 33 is lined with a soft cushion of sponge rubber or the like for comfort. The second arm 28 has an integral rearwardly extending lever 35 to which is clevised a link 36, the link also being clevised at 37 to the front end of the cradle 20. The position of the cradle pivot 21 along with the length of the lever 35 and the location of the link pivots will be so determined that when an aviator is in position with his body on the cradle 20 and his head resting in the mask 33, the head and body weights will be balanced one against the other. Thus, regardless of the downward force exerted on the body as a whole, the normal position of the aviator's head with respect to his body will be maintained.

The pivots 29, 30 and 32 are arranged so that their axes intersect approximately at the base of the aviator's neck.

The pilot's arms may rest upon suitable supports rigid with the fuselage and the normal engine controls such as 40 in Fig. 1 may be disposed for easy grasp by the pilot's hands. Alternately, the pilot's arms may be parallel to his body and the controls may be located as at 40' in Fig. 4. Flight and engine instruments may be mounted on a panel 42 disposed directly ahead of the aviator so that, by raising his head slightly he may readily observe them, as in Fig. 4. Alternately, the instruments may be mounted as at 42' in Fig. 1, alongside the pilot's body.

It is proposed that the three air controls, namely, the ailerons, the rudder, and the elevators, be operated by the pilot's feet and legs and to this end, I provide a pedestal 44 firmly secured to the fuselage structure and located rearwardly of the cradle 20. The pedestal 44 has a vertical pivot 45 about which swings a yoke 46 having longitudinal trunnions 47 in which are mounted a transverse bar 48. Integral with the bar 48 is a vertical element 49 to the top ends of which are clevised aileron control cables 50 which extend laterally through the wings to the ailerons 12. Between the ailerons is a cross connection 51 guided by pulleys 52. The cross bar 48 carries laterally spaced pedals 54 which are individually swingable about the transverse bar axis. To laterally spaced fittings 56 on the bar, rudder cables 57 are secured which lead rearwardly to horns 58 on the rudder 14.

To vertically spaced apart fittings 60 on each pedal 54 are clevised rearwardly extending rods 61, the top rods 61 being connected to the ends of a swingletree 62 whose center is connected to a cable 63 leading over pulleys 64 to cables 65 connected with the horns of the opposite elevator halves 16. The lower rods 61 are connected to a swingletree 67 whose center is connected to a cable 68 running over idler pulleys similar to the pulleys 64 to a connection with cables 69 connected to the upper horns of the opposite elevator halves 16. By the rigging above described, it should be apparent that by suitable action of the rudder pedals 54, independent or joint operation of the ailerons, elevators and rudder may be effected. A weaving motion of the pilot's legs about a longitudinal axis will afford aileron control. Pushing of either foot with corresponding relief on the other foot will afford rudder control through the movement of the bar 48 about a vertical axis. Simultaneous depression of toes or heels with corresponding relief at the opposite end of the pedal will cause the pedals 54 to rock about a transverse axis to effect control movements of the elevators 16. The swingletrees 62 and 67 allow for rudder operation without necessarily affecting the elevator controls, although by combined movement of the pedals about the transverse axis and movement of the pedals about the vertical axis, coincidental elevator and rudder action will be secured.

It is realized that the coordination of three controls in the pedals may involve the necessity for indoctrination of pilots experienced on conventional controls before safe manipulation of the aircraft may be expected, but since the control system above described involves movements which are more or less automatic to attain the end desired, no great difficulty is anticipated in changing over to the control system of the invention from the usual system. Since the force exertible by the legs of an individual is greatly in excess of that which he may impose with his hands and arms, there is no question but that the necessary control forces may be applied to the air control surfaces by the system of this invention.

Suitable provisions may be made in the aircraft for moving the control pedestal forwardly and rearwardly to allow of the comfortable accommodations of aviators of different stature or conversely, the head support pedestal 22 may be movable in a fore-and-aft direction while the pedestal 44 remains in one position.

Figs. 5, 6 and 7 show an alternate arrangement for a head support wherein a pair of laterally spaced beams 75 are pivoted on a transverse axis 76, the rearward ends of said beams being connected through links 77 with the forward end of the cradle 20. Each beam is provided with a forward pulley 78 and a rearward pulley 79. A cable 80 leads from the forward left hand corner of a face mask 81 over the left pulley 78 and over the right pulley 79 to the right rear corner of the mask 81. A cable 82 leads from the left rear corner of the face mask 81 over the left pulley 79, over the right pulley 78 to the right hand front corner of the mask 81. Thus, by this cable suspension, the mask 81 may be tilted about all three perpendicular axes, and raising of the mask 81 against depression of the cradle 20 and vice versa, is established through the beams 75. To prevent inadvertent upward movement of the mask 81, it may be held down by cables 84 and 85 reeved through pulleys 86 journaled on a frame 87 which is pivoted for lateral tilt about a fore-and-aft axis 88. The arrangement of Figs. 5, 6 and 7 is universal in character and carries all of the functional features of the arrangement of Fig. 2.

The fuselage 10 will, of course, be provided with a door of some sort for entrance and egress. Such a door is indicated in Fig. 1 at 90.

By the several features shown in the drawings and described above, I have provided a comprehensive system for aviator accommodation and aircraft control which, when used, will allow for reasonable pilot comfort during normal flight and will in addition, protect the pilot against the undesired physiological effects which are now normally encountered in acrobatic flying. Furthermore, since the frontal area of a prone aviator is so small as compared to the frontal area when seated, the aircraft body may easily be reduced to a diameter of about 30 inches and other dimensions of the airplane may be scaled down correspondingly. This basic reduction in drag would thus allow of the manufacture of small, highly maneuverable high speed airplanes having good capacity for military load and, say two guns. A multitude of such craft might be much more effective tactically than a few large pursuit craft, and the target presented to hostile craft would be much smaller.

In the foregoing description the term "downward" used with respect to force acting upon an aviator, is with respect to the airplane and connotes force along the vertical or Z axis thereof. Accordingly, steeply banked turns and other acrobatic maneuvers produce such force, as well as dive pullouts.

Further advantages flowing from the invention include the possibility of pressurizing the small-diameter cellule in which the aviator is accommodated without increasing unduly the structure thereof, due to the small volume and area of the cellule. Also, the small frontal area of the cellule affords a very small target for enemy aircraft reducing its vulnerability. The aviator compartment may be even less than the 30 inch diameter above indicated, and such a body may be effectively armored without undue weight increase.

It is contemplated that the pilot will be provided with a safety belt holding him to the body cradle and that air control rigging will be made so that twist of the aviator's body in the direction he wishes the airplane to go will effect control movement accordingly. However, the specific control rigging is considered to be a matter of choice of the designer.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft having a body portion, a cradle mounted within said body portion for supporting the torso of an occupant in a prone position, and a head support universally articulated to allow of turning of the occupant's head to any normal position with respect to its body, said head support comprising a mask against which the occupant's head rests and including a face aperture for vision, breathing and the like, an arm to which said mask is pivoted on a fore-and-aft axis, a second arm to which the first arm is pivoted on a vertical axis, and transverse fulcrum for said second arm, the second arm having a lever to which said body cradle is articulately connected.

2. In an aircraft having a body portion, a cradle pivotally mounted within said body portion about a transverse axis for supporting the torso of an occupant in a prone position, a head rest supported within said body portion adjacent to the front end of said cradle, a universal mounting for said head rest to allow free tilting of the head rest in any direction, and means interconnecting said head rest and cradle to balance the weight carried by the head rest against the weight carried by the cradle.

3. In an aircraft having a body portion, a cradle pivotally mounted within said body portion about a transverse axis for supporting the torso of an occupant in a prone position, a head support pivotally mounted adjacent to the front end of said cradle, means interconnecting said head support with the adjacent end of said cradle to enforce downward tilt of the front end of said cradle upon upward tilt of said head support and vice versa.

4. In an aircraft having a body portion, a cradle pivotally mounted within said body portion about a transverse axis for supporting the torso of an occupant in a prone position, a head support mounted for free pivotal movement about a transverse axis disposed adjacent to the front end of said cradle, and means interconnecting said head support and cradle to balance the weight carried by the head support against the weight carried by the cradle.

5. In an aircraft having a body portion, a cradle mounted within said body portion for supporting the torso of an occupant in a prone position, a pair of leg supporting portions pivotally supported about a transverse axis adjacent the rear end of said cradle, and means interconnecting said leg supporting portions to enforce upward pivotal movement of one leg supporting portion in response to downward pivotal movement of the other leg supporting portions and vice versa.

HERBERT V. SHEBAT.